United States Patent
Wang (10) Patent No.: US 11,088,627 B2
(45) Date of Patent: Aug. 10, 2021

(54) SWITCHING POWER SUPPLY CIRCUIT WITH SYNCHRONOUS RECTIFICATION AND ASSOCIATED CONTROL METHOD

(71) Applicant: Chengdu Monolithic Power Systems Co. Ltd., Chengdu (CN)

(72) Inventor: Siran Wang, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 31 days.

(21) Appl. No.: 16/742,896

(22) Filed: Jan. 14, 2020

(65) Prior Publication Data

US 2020/0153352 A1 May 14, 2020

Related U.S. Application Data

(63) Continuation of application No. 16/195,712, filed on Nov. 19, 2018, now Pat. No. 10,673,344.

(30) Foreign Application Priority Data

Nov. 27, 2017 (CN) .......................... 201711205274.4

(51) Int. Cl.
*H02M 3/335* (2006.01)
*H02M 1/08* (2006.01)
*H02M 1/00* (2006.01)

(52) U.S. Cl.
CPC ...... *H02M 3/33592* (2013.01); *H02M 1/0029* (2021.05); *H02M 1/08* (2013.01); *Y02B 70/10* (2013.01)

(58) Field of Classification Search
CPC ..... H02M 2001/0029; H02M 3/33592; H02M 1/08; H02M 1/0029
See application file for complete search history.

(56) References Cited

U.S. PATENT DOCUMENTS

| | | | |
|---|---|---|---|
| 9,397,577 B2 | 7/2016 | Wang et al. | |
| 9,407,155 B2 | 8/2016 | Wang et al. | |
| 10,673,344 B2* | 6/2020 | Wang | H02M 3/33592 |
| 2009/0268494 A1 | 10/2009 | Hu | |
| 2010/0124086 A1* | 5/2010 | Chen | H02M 3/33592 |
| | | | 363/127 |
| 2011/0110122 A1* | 5/2011 | Chen | H02M 3/33592 |
| | | | 363/21.13 |
| 2015/0016154 A1* | 1/2015 | Wang | H02M 1/4258 |
| | | | 363/21.12 |
| 2015/0103567 A1* | 4/2015 | Wang | H02M 3/33592 |
| | | | 363/21.13 |

(Continued)

*Primary Examiner* — Fred E Finch, III
(74) *Attorney, Agent, or Firm* — Perkins Coie LLP (57) ABSTRACT

A switching power supply circuit with synchronous rectifier has an energy storage component, a rectifier switch coupled to a secondary side of the energy storage component, and a secondary side control circuit. The secondary side control circuit provides a driving signal to control the rectifier switch. When the drain-source voltage across the rectifier switch is less than a first threshold value, the secondary side control circuit controls the driving signal to be a maximum voltage to control the rectifier switch being fully on for a predetermined duration. After a predetermined duration, the secondary side control circuit adjusts the voltage of the driving signal based on the drain-source voltage across the rectifier switch and a second threshold value.

22 Claims, 6 Drawing Sheets

(56) References Cited

U.S. PATENT DOCUMENTS

| | | | |
|---|---|---|---|
| 2015/0207420 A1* | 7/2015 | Wang | H02M 3/33507 |
| | | | 363/21.12 |
| 2017/0222568 A1* | 8/2017 | Choi | H02M 3/33592 |
| 2017/0317598 A1* | 11/2017 | Ptacek | H02M 3/33592 |
| 2017/0317602 A1* | 11/2017 | Kleinpenning | H02M 1/08 |
| 2017/0353099 A1 | 12/2017 | Yang et al. | |
| 2018/0013352 A1* | 1/2018 | Cao | H02M 3/33515 |
| 2018/0091040 A1 | 3/2018 | Wong et al. | |
| 2018/0212527 A1 | 7/2018 | Kong et al. | |
| 2018/0358885 A1 | 12/2018 | Tao et al. | |
| 2019/0006950 A1 | 1/2019 | Kong et al. | |
| 2019/0020282 A1 | 1/2019 | Li et al. | |
| 2019/0165686 A1 | 5/2019 | Wang | |

\* cited by examiner

SWITCHING POWER SUPPLY CIRCUIT WITH SYNCHRONOUS RECTIFICATION AND ASSOCIATED CONTROL METHOD

CROSS-REFERENCE TO RELATED APPLICATIONS

This application is a continuation of U.S. patent application Ser. No. 16/195,712, filed on Nov. 19, 2018, which claims the benefit of CN application No. 201711205274.4, filed on Nov. 27, 2017. The aforementioned related applications are incorporated herein by reference in their entireties.

TECHNICAL FIELD

The present invention relates to electrical circuit, more particularly but not exclusively relates to a switching power supply circuit with synchronous rectification and associated control method.

BACKGROUND

Figure 1A:
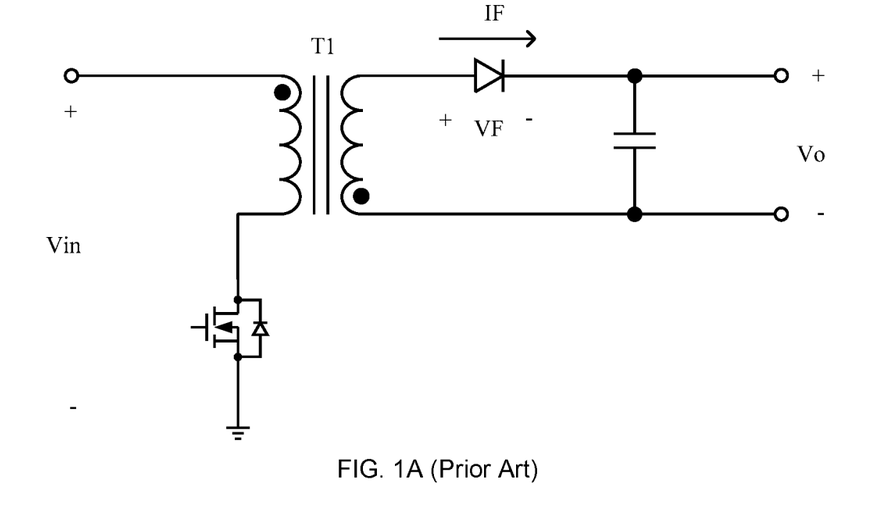
FIG. 1A schematically illustrates a circuit block of a flyback switching power supply circuit with asynchronous rectifier at the secondary side.
Figure 1B:
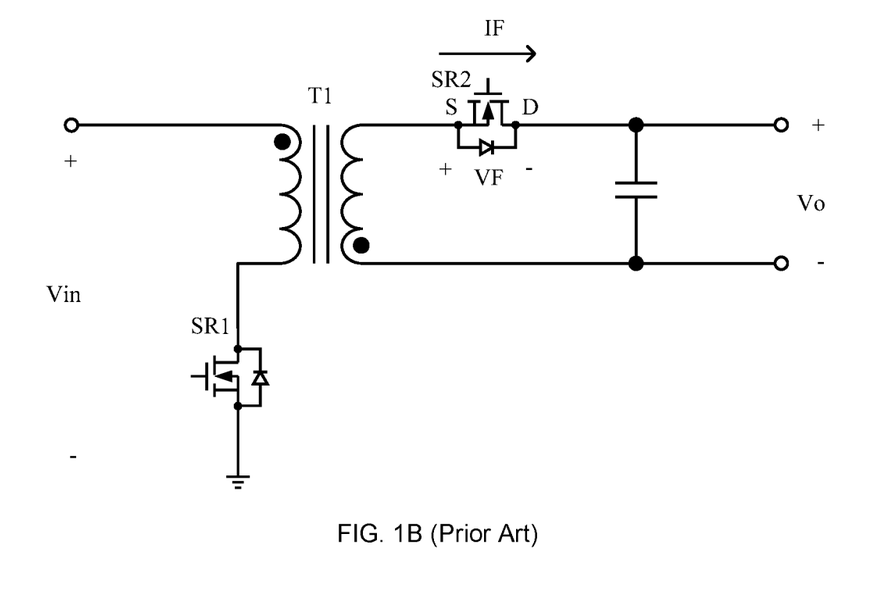
FIG. 1B schematically illustrates a circuit block of a flyback switching power supply circuit with synchronous rectifier at the secondary side.
Figure 2:
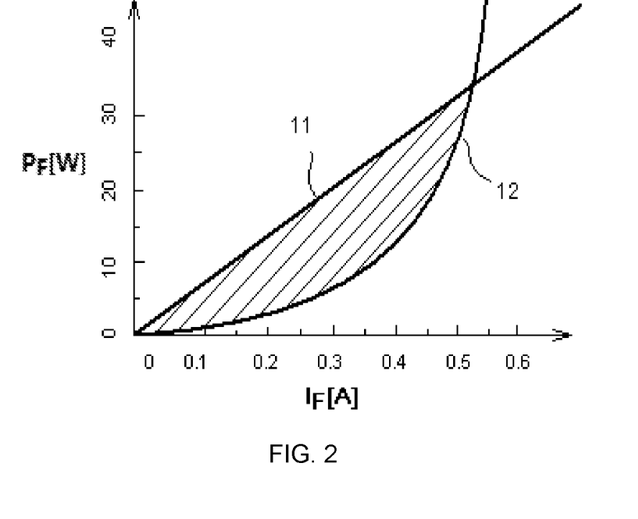
FIG. 2 schematically illustrates the resistance characteristics of a diode and a rectifier.

There are two traditional secondary side rectification schemes for a flyback switching power supply circuit, wherein one is asynchronous rectifier scheme, i.e., using a diode (as shown in FIG. 1A), and the other one is synchronous rectifier scheme (as shown in FIG. 1B). The synchronous rectifier scheme is to control a rectifier SR2 to be turned on and off by a gate driving signal. FIG. 2 illustrates characteristics of the power consumption of a diode and a rectifier. In practical applications, a working range of a low-power flyback switching power supply circuit is in the shadow region shown in FIG. 2. In the shadow region, a power consumption characteristic curve 12 of the rectifier is below a power consumption characteristic curve 11 of the diode, i.e., the power consumption of the rectifier is lower than the power consumption of the diode. Therefore, the synchronous rectifier scheme can realize less power consumption than the asynchronous rectifier scheme, thus obtaining higher conversion efficiency. Low power consumption generates less heat, so the temperature characteristic of the rectifier is also superior.

The secondary side rectification scheme is widely applied to notebook power adapters, wireless communication devices, LCD power management, and Ethernet power supplies because of its high conversion efficiency. With the development of electronic technology, it is necessary to propose a secondary side rectification scheme with both high efficiency and good robustness.

SUMMARY

It is one of the objects of the present invention to provide a switching power supply circuit with synchronous rectification and associated control method.

One embodiment of the present invention discloses a switching power supply circuit with synchronous rectification, comprising: an energy storage component, comprising a primary side configured to receive an input voltage and a secondary side configured to provide an output voltage; a primary switch, coupled to the primary side of the energy storage component; a rectifier switch, coupled to the secondary side of the energy storage component; a secondary side control circuit, comprising a first input terminal and an output terminal, wherein the first input terminal is configured to receive a drain-source voltage across the rectifier switch, and the output terminal is configured to provide a driving signal to control the rectifier switch; wherein when the drain-source voltage across the rectifier switch is less than a first threshold value, the secondary side control circuit is configured to control the rectifier switch to be turned on and control the driving signal to be a maximum voltage for a predetermined duration in order to keep the rectifier switch being fully on, wherein the predetermined duration is configured to be generated according to an on-time period of the primary side switch, the input voltage, and the output voltage; and wherein after the rectifier switch is turned on for the predetermined duration, the secondary side control circuit is configured to adjust the driving signal according to the drain-source voltage across the rectifier switch and a second threshold value.

Another embodiment of the present invention discloses a control method for a switching power supply circuit with synchronous rectification, wherein the switching power supply circuit comprises an energy storage component, a primary switch coupled to a primary side of the energy storage component, and a rectifier switch coupled to a secondary side of the energy storage component, and the switching power supply circuit is configured to provide an output voltage at the secondary side of the energy storage component, the control method comprising: providing a driving signal according to a drain-source voltage across the rectifier switch to control the rectifier switch; turning on the rectifier switch when the drain-source voltage across the rectifier switch is less than a first threshold value; controlling the driving signal to be a maximum voltage for a predetermined duration after the rectifier switch is turned on; adjusting the driving signal according to the drain-source voltage across the rectifier switch and a second threshold value after an on-time period of the rectifier switch reaches the predetermined duration; and turning off the rectifier switch when the drain-source voltage across the rectifier switch is greater than a turn-off threshold value, wherein the turn-off threshold value is greater than the second threshold value.

Yet another embodiment of the present invention discloses a switching power supply circuit with synchronous rectification, comprising: an energy storage component, comprising a primary side coupled to a primary switch and a secondary side configured to provide an output voltage; a rectifier switch, coupled to the secondary side of the energy storage component; a secondary side control circuit, configured to provide a driving signal to control the rectifier switch according to a first threshold value, a second threshold value, a turn-off threshold and a drain-source voltage across the rectifier switch; wherein when the drain-source voltage across the rectifier switch is less than the first threshold value, the secondary side control circuit is configured to control the rectifier switch being fully turned on for a predetermined duration; after the predetermined duration expired, the secondary side control circuit is configured to control the driving signal according to the second threshold value and the drain-source voltage across the rectifier switch, wherein the second threshold value is less than the first threshold value; and when the drain-source voltage across the rectifier switch is greater than the turn-off threshold, the secondary side control circuit is configured to control the rectifier switch to be turned off.

According to the embodiments of the present invention, the switching power supply circuit can obtain high efficiency, fast switching speed, and good robustness.

BRIEF DESCRIPTION OF THE DRAWINGS

Non-limiting and non-exhaustive embodiments are described with reference to the following drawings.

DETAILED DESCRIPTION

In the present application, numerous specific details are described to provide a thorough understanding of the present invention, such as examples of circuits, components, and methods. These embodiments illustrated are exemplary, not to confine the scope of the invention. A person ordinary skilled in the art will recognize, however, that the invention can be implemented without one or more of the specific details. In other instances, well-known details are not shown or described to avoid obscuring the aspects of the invention. Some phrases are used in some exemplary embodiments. However, the usage of these phrases is not confined to these embodiments.

The switching power supply circuit illustrated in the embodiments comprises an energy storage component, a primary switch coupled to a primary side of the energy storage component, a rectifier switch coupled to a secondary side of the energy storage component, and a secondary side control circuit. The secondary side control circuit is configured to provide a driving signal to control the rectifier switch. When a drain-source voltage of the rectifier switch is less than a first threshold value, the secondary side control circuit is configured to control the rectifier switch to be turned on, and configured to control the driving signal to maintain being a maximum voltage to ensure the rectifier switch being fully turned on during a predetermined duration. After the rectifier switch being turned on for the predetermined duration, the secondary side control circuit is configured to adjust a voltage of the driving signal according to the drain-source voltage of the rectifier switch and a second threshold value. Therefore, the rectifier switch has high efficiency in a full load range, and the rectifier switch can be quickly turned off after the predetermined duration, preventing a short-through between the rectifier switch and the primary switch.

Figure 3:
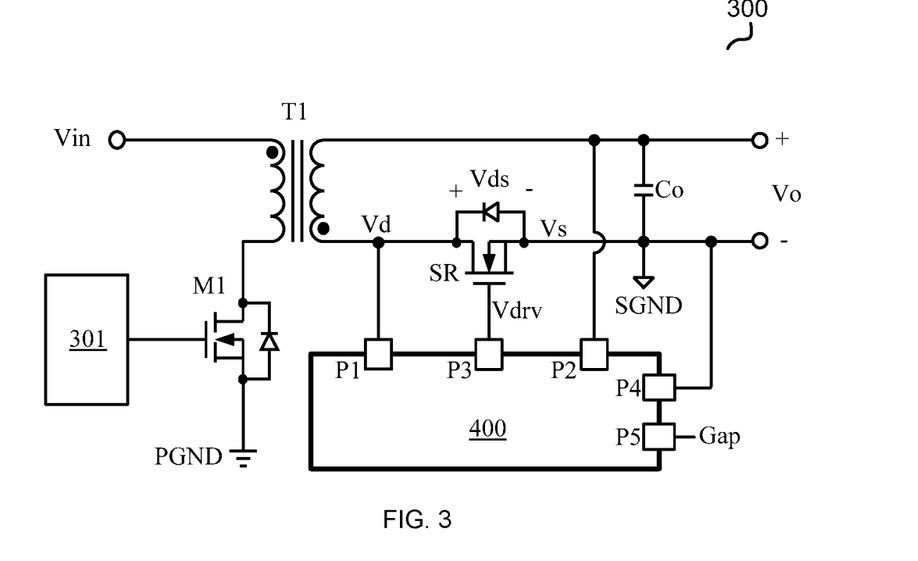
FIG. 3 schematically illustrates a circuit block of a switching power supply circuit 300 according to an embodiment of the present invention.

FIG. 3 schematically illustrates a circuit block of a switching power supply circuit 300 according to an embodiment of the present invention. The switching power supply circuit 300 comprises an energy storage component T1, a primary switch M1 coupled to the primary side of the energy storage component T1, a primary side control circuit 301 for controlling the primary switch M1, a rectifier switch SR coupled to the secondary side of the energy storage component T1, and a secondary side control circuit 400 for controlling the rectifier switch SR. In one embodiment, the rectifier switch SR comprises a parasitic body diode. The switching power supply circuit 300 is configured to receive an input voltage Vin from the primary side of the energy storage component T1 and provide an output voltage Vo at the secondary side of the energy storage element T1. In one embodiment, the secondary side control circuit 400 is configured to be an integrated circuit (IC) which comprises pins P1 to P4, wherein the pins P1, P2, and P4 are input terminals of the secondary side control circuit 400, and the pin P3 is an output terminal of the secondary side control circuit 400. The pin P1 is coupled to a drain of the rectifier switch SR to receive a drain voltage Vd of the rectifier switch SR, the pin P4 is coupled to a source of the rectifier switch SR to receive a source voltage Vs of the rectifier switch SR, and the pin P4 is coupled to a secondary side ground SGND. In the embodiment illustrated in FIG. 3, a voltage at the pin P1 is the drain-source voltage Vds across the rectifier switch SR. The pin P2 is configured to receive the output voltage Vo. The pin P3 is coupled to a gate of the rectifier switch SR, and configured to output a driving signal Vdrv to control the rectifier switch SR. In one embodiment, the secondary side control circuit 400 is configured to control the driving signal Vdrv to maintain being the maximum voltage in order to control the rectifier switch SR being fully turned on for a predetermined duration, wherein the rectifier switch SR is configured to operate in a saturation region. After the predetermined duration expired, the secondary side control circuit 400 is configured to regulate a voltage of the driving signal Vdrv according to the drain-source voltage Vds across the rectifier switch SR. In one embodiment, the secondary side control circuit 400 is configured to obtain the predetermined duration according to an on-time period of the primary switch M1, the input voltage Vin, and the output voltage Vo. In one embodiment, the secondary side control circuit 400 further comprises a pin P5, wherein the pin P5 is configured to be an input terminal to receive a duration adjustment voltage Gap, and the secondary side control circuit 400 is configured to adjust the predetermined duration according to the duration adjustment voltage Gap.

Figure 4:
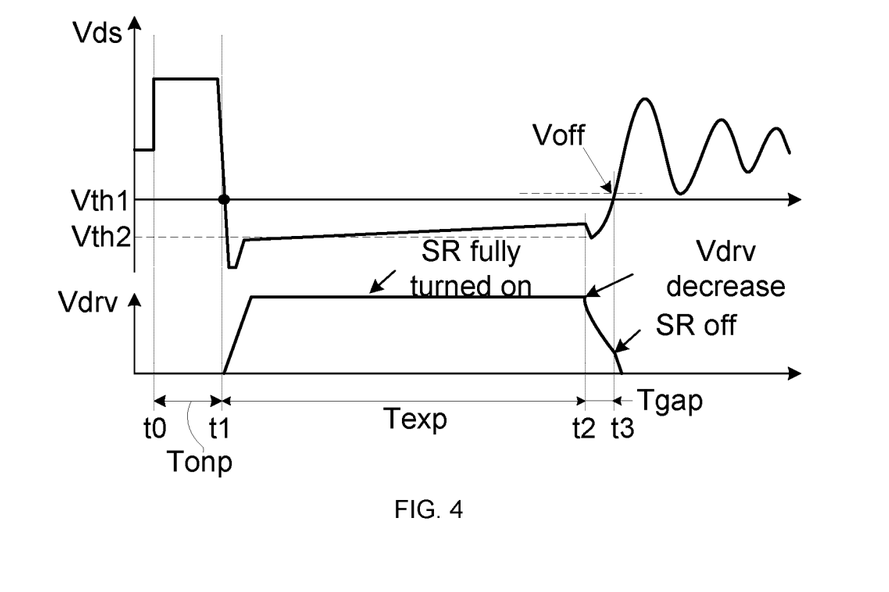
FIG. 4 shows waveforms of the switching power supply circuit 300 shown in FIG. 3 according to an embodiment of the present invention.

FIG. 4 shows waveforms of the switching power supply circuit 300 shown in FIG. 3 according to an embodiment of the present invention. As shown in FIG. 4, at a moment t0, the primary switch M1 is turned on, and the drain-source voltage Vds across the rectifier switch SR increases. At a moment t1, the primary switch M1 is turned off, and the parasitic body diode of the rectifier switch SR is turned on, so that the drain-source voltage Vds across the rectifier switch SR becomes a negative value, e.g. −0.7V. When the drain-source voltage Vds across the rectifier switch SR is less than the first threshold value Vth1, after a delay time, the secondary side control circuit 400 is configured to control the rectifier switch SR to be turned on by the driving signal Vdrv, and the parasitic body diode of the rectifier switch SR is configured to be turned off. The first threshold value Vth1 is e.g. equal to zero or less than a reference value. As shown in FIG. 4, after the delay time, the driving signal Vdrv is configured to maintain being the maximum voltage to control the rectifier switch SR being fully turned on, the rectifier switch SR is configured to operate in the saturation region, and the rectifier switch SR comprises a minimum on-resistance Rdson which does not vary with the current, meanwhile, the rectifier switch SR comprises a minimum conduction loss even though with a large current. In one embodiment, the secondary side control circuit 400 is configured to adjust the the driving signal Vdrv according to the drain-source voltage Vds across the rectifier switch SR and the first threshold value Vth1 to maintain the driving signal Vdrv being the maximum voltage. Until to a moment t2, the on-time period of the rectifier switch SR reaches the predetermined duration Texp, the secondary side control circuit 400 is configured to adjust the voltage of the driving signal Vdrv according to the drain-source voltage Vds across the rectifier switch SR and the second threshold value Vth2, wherein the second threshold value Vth2 is less than the first threshold value Vth1. The second threshold value Vth2 is less than zero and greater than a turn-on voltage of the parasitic body diode of the rectifier switch SR, e.g. equal to −30 mV. Meanwhile, the conduction loss of the rectifier switch SR is still much less than the conduction loss of the parasitic body diode in the rectifier switch SR. As shown in FIG. 4, because of a current flowing through the rectifier switch SR decreases, after the predetermined duration Texp, in order to keep the drain-source voltage Vds across the rectifier switch SR being the second threshold value Vth2, the driving signal Vdrv is configured to gradually decrease as the current decreases in order to increase an on-resistance of the rectifier switch SR, and the rectifier switch SR is configured to operate in a linear region. Until to a moment t3, the drain-source voltage Vds across the rectifier switch SR increases to be greater than a turn-off threshold value Voff though the driving signal Vdrv decreases continuously, and the secondary side control circuit 400 is configured to turn off the rectifier switch SR by the driving signal Vdrv, wherein the turn-off threshold value Voff is greater than the second threshold value Vth2. The turn-off threshold value Voff is e.g. equal to +30 mV. In the embodiment illustrated in FIG. 4, during the predetermined duration Texp (t1~t2), the rectifier switch SR is configured to operate in the saturation region, so the on-resistance of the rectifier switch SR is the smallest, and the conduction loss of the rectifier switch is the least. After the predetermined duration Texp (t2-t3), the voltage of the driving signal Vdrv decreases, the rectifier switch SR is configured to operate in the linear region, the on-resistance of the rectifier switch SR increases. So the rectifier switch SR can be turned off fast and with a low conduction loss moreover, and a risk of being directly connected to the primary switch M1 due to the slow shutdown speed of the rectifier switch SR is avoided.

In one embodiment, when the switching power supply circuit 300 is configured to be a flyback circuit, an on-time period Tons required by the rectifier switch SR can be obtained by the energy conservation principle at a steady state:

$$Tons = \frac{Vin}{N \cdot Vo} \cdot Tonp = \frac{Vds - Vo}{Vo} \cdot Tonp \qquad (1)$$

Wherein N is a turns ratio between the primary side and the secondary side of the energy storage component T1, and Tonp is the on-time period of the primary switch M1. The on-time period Tonp of the primary switch M1 is obtained e.g. by detecting the driving signal Vdrv, such as t0-t1 shown in FIG. 4.

Accordingly, the predetermined duration Texp can be obtained e.g. by subtracting a certain gap time Tgap from the on-time period Tons:

$$T\exp = \frac{Vds - Vo}{Vo} \cdot Tonp - Tgap \qquad (2)$$

In one embodiment, the predetermined duration Texp and the output voltage Vo vary inversely, e.g. the predetermined duration Texp decreases as the output voltage Vo increases, and increases as the output voltage Vo decreases. In one embodiment, the predetermined duration Texp and the on-time period Tonp of the primary-side switch M1 vary in a same direction, e.g the predetermined duration Texp increases as the on-time period Tonp of the primary switch M1 increases, and decreases as the on-time period Tonp of the primary switch M1 decreases. In one embodiment, the predetermined duration Texp and the input voltage Vin vary in a same direction, e.g. the predetermined duration Texp increases as the input voltage Vin increases, and decreases as the input voltage Vin decreases. In one embodiment, the gap time Tgap is configured to be adjusted by the duration adjustment voltage Gap, thus adjusting the predetermined duration Texp.

Figure 5:
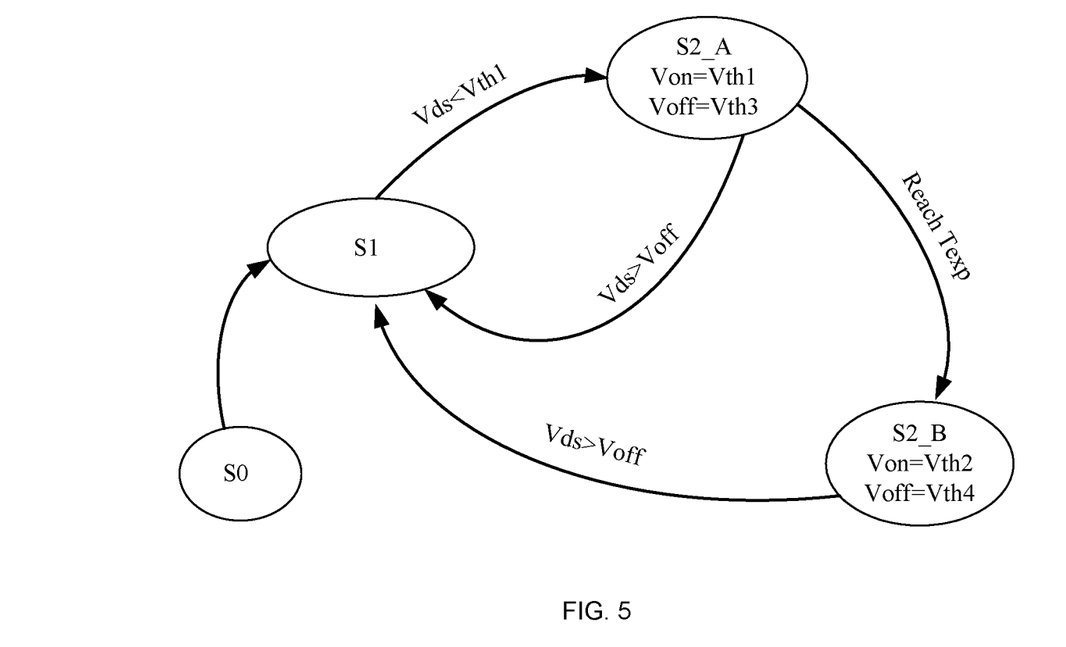
FIG. 5 shows a state flow chart of the switching power supply circuit 300 according to an embodiment of the present invention.

FIG. 5 shows a state flow chart of the switching power supply circuit 300 according to an embodiment of the present invention. In the embodiment shown in FIG. 5, the switching power supply circuit 300 comprises states S0, S1, S2_A, and S2_B.

Wherein the state S0 comprises: starting the switching power supply circuit 300, then entering into the state S1.

State S1 comprises: turning off the rectifier switch SR, wherein when the drain-source voltage Vds across the rectifier switch SR is less than the first threshold value Vth1, the switching power supply circuit 300 is configured to enter into the state S2_A.

State S2_A comprises: turning on the rectifier switch SR, and the driving signal Vdrv is configured to be the maximum voltage to control the rectifier switch SR being fully turned on, and the rectifier switch SR is configured to operate in the saturation region. At the state S2_A, the turn-on threshold value Von is set equal to the first threshold value Vth1, and the turn-off threshold value Voff is set equal to the third threshold value Vth3. At the state S2_A, the driving signal Vdrv is configured to be adjusted according to the drain-source voltage Vds across the rectifier switch SR and the first threshold value Vth1. When the drain-source voltage Vds across the rectifier switch SR is greater than the turn-off threshold value Voff, the switching power supply circuit 300 is configured to enter into the state S1, and when the on-time period of the rectifier switch SR reaches the predetermined duration Texp, the switching power supply circuit 300 is configured to enter into the state S2_B.

State S2_B comprises: setting the turn-on threshold value Von to be equal to the second threshold value Vth2, and setting the turn-off threshold value Voff to be equal to the fourth threshold value Vth4. At the state S2_B, the driving signal Vdrv is configured to be adjusted according to the drain-source voltage Vds across the rectifier switch SR and the second threshold value Vth2. When the drain-source voltage Vds across the rectifier switch SR is greater than the turn-off threshold value Voff, the switching power supply circuit 300 is configured to enter into the state S1.

Figure 6:
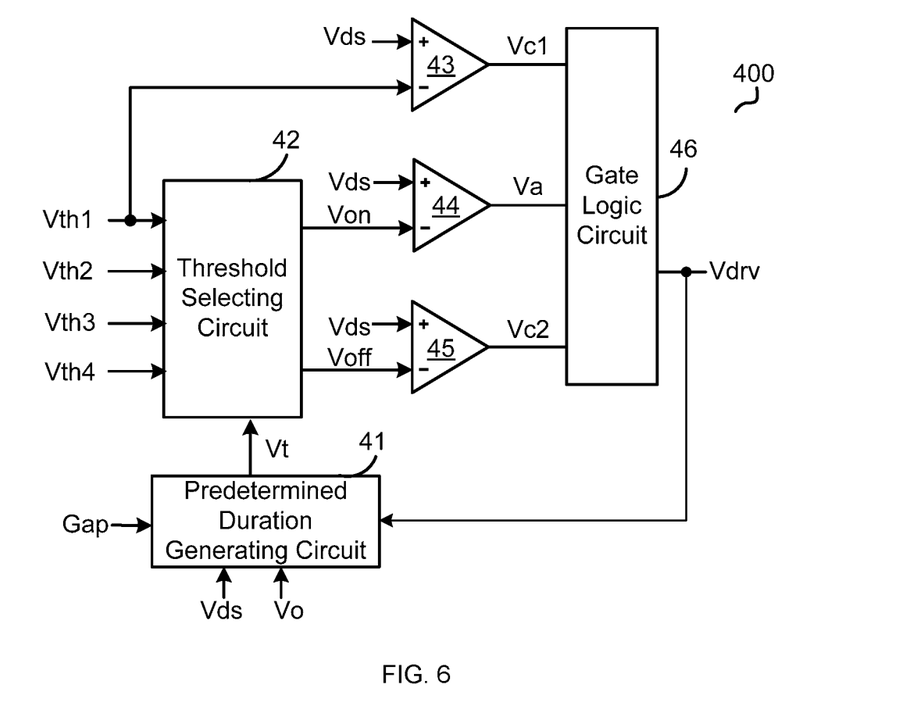
FIG. 6 schematically illustrates a circuit block of a secondary side control circuit 400 according to an embodiment of the present invention.

FIG. 6 schematically illustrates a circuit block of a secondary side control circuit 400 according to an embodiment of the present invention. In the embodiment illustrated in FIG. 6, the secondary side control circuit 400 comprises a predetermined duration generating circuit 41, a threshold selecting circuit 42, a first comparison circuit 43, an amplifying circuit 44, a second comparison circuit 45, and a gate logic circuit 46. Wherein the predetermined duration generating circuit 41 is configured to receive the drain-source voltage Vds, the output voltage Vo and the driving signal Vdrv across the rectifier switch SR, and output a predetermined duration signal Vt representing the predetermined duration Texp. The threshold selecting circuit 42 is configured to receive the first threshold value Vth1, the second threshold value Vth2 and the predetermined duration signal Vt, and provide the turn-on threshold value Von according to the first threshold value Vth1, the second threshold value Vth2 and the predetermined duration signal Vt. When the predetermined duration signal Vt is at a first state (e.g., high level), and the on-time period of the rectifier switch SR does not reach the predetermined duration Texp, the threshold selecting circuit 42 is configured to provide the turn-on threshold Von according to the first threshold value Vth1. When the predetermined duration signal Vt is at a second state (e.g., low level), and the on-time period of the rectifier switch SR reaches the predetermined duration Texp, the threshold selecting circuit 42 is configured to provide the turn-on threshold value Von according to the second threshold value Vth2. In one embodiment, the threshold selection circuit 42 is further configured to receive a third threshold value Vth3 and a fourth threshold value Vth4, and configured to provide the turn-off threshold value Voff according to the third threshold value Vth3, the fourth threshold value Vth4 and the predetermined duration signal Vt. When the predetermined duration signal Vt is at the first state, and the on-time period of the rectifier switch SR does not reach the predetermined duration Texp, the threshold selecting circuit 42 is configured to provide the turn-off threshold value Voff according to the third threshold. And when the predetermined duration signal Vt is at the second state, the on-time period of the rectifier switch SR reaches the predetermined duration Texp, the threshold selecting circuit 42 is configured to provide the turn-off threshold value Voff according to the fourth threshold value Vth4. In one embodiment, the third threshold value Vth3 is greater than or equal to the fourth threshold value Vth4, and the fourth threshold value Vth4 is greater than the second threshold value Vth2. The first comparison circuit 43 is configured to receive the drain-source voltage Vds across the rectifier switch SR and the first threshold value Vth1, and configured to provide a first comparison signal Vc1 according to a compare result of the drain-source voltage Vds and the first threshold value Vth1. The amplifying circuit 44 is configured to receive the drain-source voltage Vds across the rectifying switch SR and the turn-on threshold value Von, and configured to provide an amplified signal Va based on a difference value Vds-Von of the drain-source voltage Vds across the rectifier switch SR and the turn-on threshold value Von. The second comparison circuit 45 is configured to receive the drain-source voltage Vds across the rectifier switch SR and the turn-off threshold value Voff, and configured to provide a second comparison signal Vc2 based on a compare result of the drain-source voltage Vds across the rectifier switch SR and the turn-off threshold value Voff. The gate logic circuit 46 is configured to provide the driving signal Vdrv, and configured to control a turn-on moment of the rectifier switch SR according to the drain-source voltage Vds across the rectifier switch SR and the first threshold value, and configured to adjust the magnitude of the driving signal Vdrv based on the difference value Vds-Von of the drain-source voltage Vds across the rectifier switch SR and the turn-on threshold value Von, and configured to control the turn-off moment of the rectifier switch SR according to the drain-source voltage Vds across the rectifier switch SR and the turn-off threshold value Voff. In one embodiment, the gate logic circuit 46 is configured to receive the first comparison signal Vc1, the second comparison signal Vc2 and the amplified signal Va, and configured to generate the driving signal Vdrv according to the first comparison signal Vc1, the second comparison signal Vc2 and the amplified signal Va.

Figure 7:
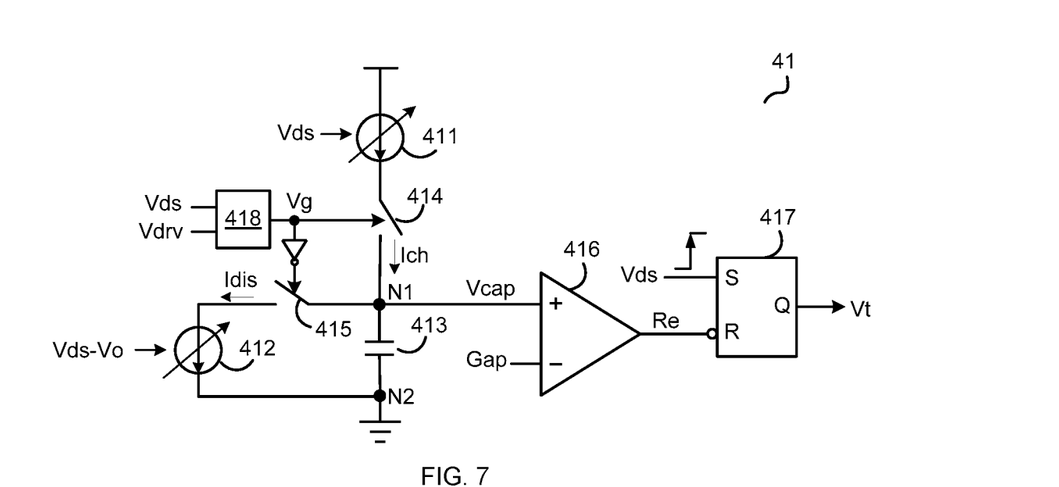
FIG. 7 schematically illustrates a circuit block of a predetermined duration generating circuit 41 according to an embodiment of the present invention.

FIG. 7 schematically illustrates a circuit block of the predetermined duration generating circuit 41 according to an embodiment of the present invention. In the embodiment illustrated in FIG. 7, the predetermined duration generating circuit 41 comprises a first current source 411, a second current source 412, a capacitor 413, a switch 414, a switch 415, a third comparison circuit 416, and an output logic circuit 417. The capacitor 413 comprises a first terminal N1 and a second terminal N2. The first current source 411 is configured to charge the capacitor 413 with a charging current Ich when the primary switch M1 is turned on. The charging current Ich is configured to be directly proportional to the drain-source voltage Vds across the rectifier switch SR. The second current source 412 is configured to discharge the capacitor 413 with a discharge current Idis when the rectifier switch SR is turned on. The discharge current Idis is configured to be directly proportional to the difference value Vds-Vo of the drain-source voltage Vds across the rectifier switch SR and the output voltage Vo. In one embodiment, the first current source 411 is coupled to the first terminal N1 of the capacitor 413 through the switch 414, and the second current source 412 is coupled between the first terminal N1 and the second terminal N2 of the capacitor 413 through the switch 415. In one embodiment, the logic circuit 418 is configured to generate a control signal Vg according to the drain-source voltage Vds and the driving signal Vdrv to control the switch 414 and the switch 415 to be turned on and off. In one embodiment, when the drain-source voltage Vds indicates that the primary-side switch M1 is on, the control signal Vg is configured to control the switch 414 to be turned on, and control the switch 415 to be turned off, and the first current source 411 is configured to charge the capacitor 413 through the switch 414, so a voltage Vcap across the capacitor 413 increases. When the driving signal Vdrv indicates that the rectifier switch SR is on, the control signal Vg is configured to control the switch 414 to be turned off, and control the switch 415 to be turned on, and the second current source 412 is configured to discharge the capacitor 413 through the switch 415, the voltage Vcap to decreases. The third comparison circuit 416 is configured to receive the voltage Vcap and the duration adjustment voltage Gap, and configured to generate a reset signal Re based on a compare result of the voltage Vcap and the duration adjustment voltage Gap. The output logic circuit 417 is configured to generate the predetermined duration signal Vt according to the reset signal Re and the drain-source voltage Vds across the rectifier switch SR. When a rising edge of the drain-source voltage Vds across the rectifier switch SR is detected, the output logic circuit 417 is configured to set the predetermined duration signal Vt e.g. to a high level, indicating that the rectifier switch SR is on. And when the voltage across the capacitor 413 Vcap is less than the duration adjustment voltage Gap, the output logic circuit 417 is configured to reset the predetermined duration signal Vt e.g. to a low level, indicating that the on-time period of the rectifier switch SR reaches the predetermined duration Texp. In one embodiment, the output logic circuit 417 comprises an RS trigger circuit, wherein the RS trigger circuit comprises a set input terminal S, a reset input terminal R and an output terminal Q. The set input terminal S is configured to receive the drain-source voltage Vds across the rectifier switch SR. The reset input terminal R is coupled to an output terminal of the third comparison circuit 416 to receive the reset signal Re. And the output terminal Q is configured to generate the predetermined duration signal Vt according to the reset signal Re and the drain-source voltage Vds.

Figure 8:
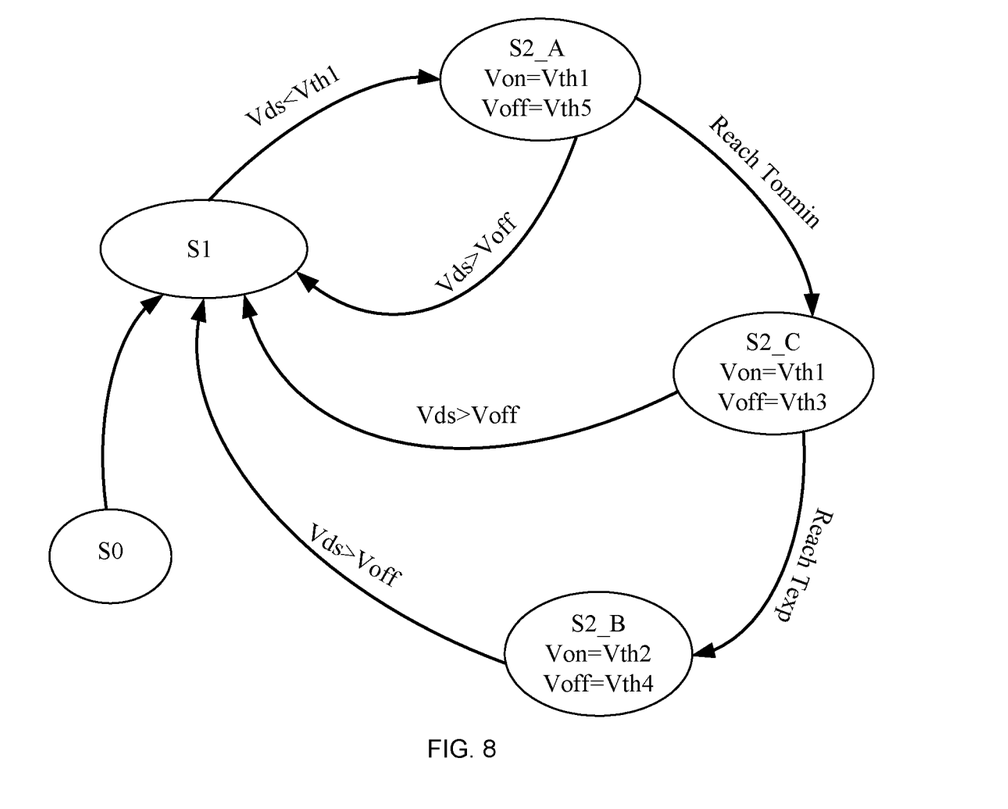
FIG. 8 shows a state flow chart of the switching power supply circuit 300 according to another embodiment of the present invention.

FIG. 8 shows a state flow chart of the switching power supply circuit 300 according to another embodiment of the present invention. The states S0, S1 and S2_B in the embodiment shown in FIG. 8 are the same as that in the embodiment shown in FIG. 5. In the embodiment shown in FIG. 8, the switching power supply circuit 300 further comprises a state S2_C.

In the embodiment illustrated in FIG. 8, the state S2_A comprises: turning on the rectifier switch SR, maintaining the driving signal Vdrv being the maximum voltage to control the rectifier switch SR being fully turned on, and the rectifier switch SR is configured to operate in the saturation region. In the embodiment shown in FIG. 8, at the state S2_A, the turn-on threshold value Von is set equal to the first threshold value Vth1, and the turn-off threshold value Voff is set equal to the fifth threshold value Vth5. When the drain-source voltage Vds across the rectifier switch SR is greater than the threshold value Voff, the switching power supply circuit 300 is configured to enter into the state S1; and when the on-time period of the rectifier switch SR reaches a minimum on-time period Tonmin, the switching power supply circuit 300 is configured to enter into the state S2_C.

In the embodiment shown in FIG. 8, the state S2_C comprises: maintaining the driving signal Vdrv being the maximum voltage to control the rectifier switch SR being fully turned on, and the rectifier switch SR is configured to operate in the saturation region. In the embodiment shown in FIG. 8, at the state S2_C, the turn-on threshold value Von is set equal to the first threshold value Vth1, and the turn-off threshold value Voff is set equal to the third threshold value Vth3. The fifth threshold value Vth5 is greater than the third threshold value Vth3. When the drain-source voltage Vds across the rectifier switch SR is greater than the turn-off threshold value Voff, the switching power supply circuit 300 is configured to enter into the state S1; and when the on-time period of the rectifier switch SR reaches the predetermined duration Texp, the switching power supply circuit 300 is configured to enter into the state S2_B.

Figure 9:
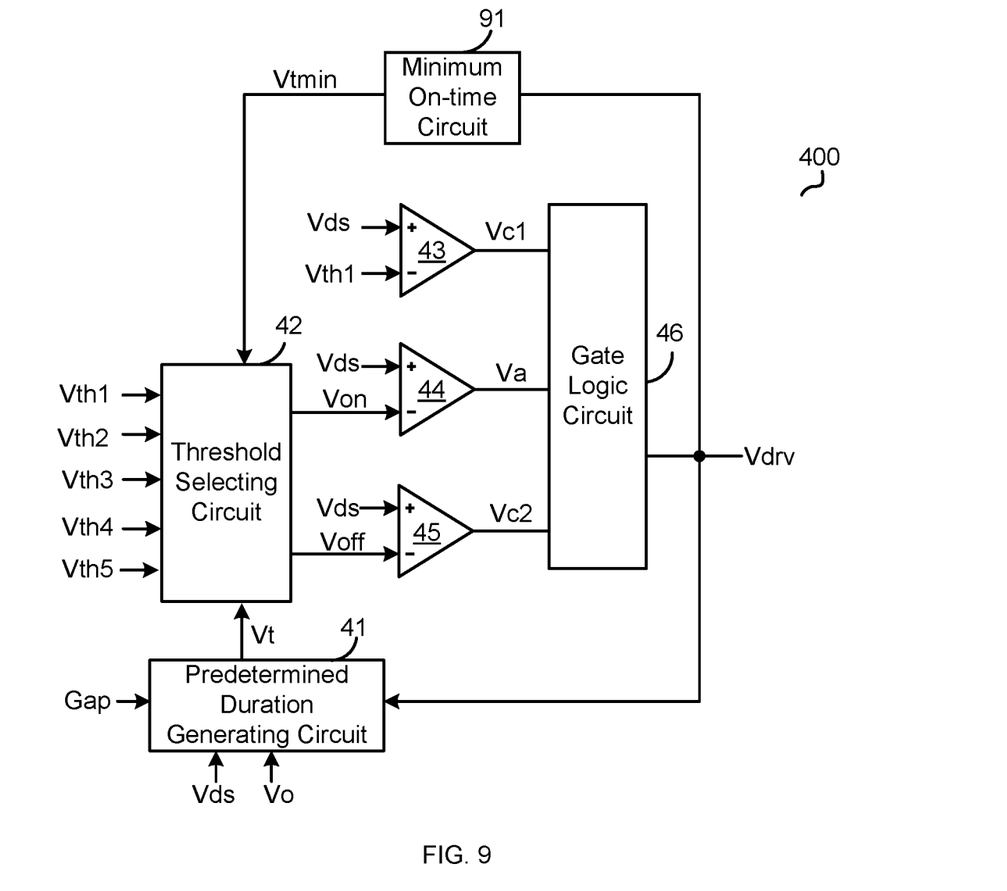
FIG. 9 schematically illustrates a circuit block of a secondary side control circuit 400 according to another embodiment of the present invention

FIG. 9 schematically illustrates a circuit block of a secondary side control circuit 400 according to another embodiment of the present invention. In the embodiment shown in FIG. 9, the secondary side control circuit 400 further comprises a minimum on-time circuit 91. Wherein the minimum on-time circuit 91 is configured to generate a minimum on-time signal Vtmin according to the driving signal Vdrv. The threshold selecting circuit 42 is further configured to receive the fifth threshold value Vth5, and the threshold selecting circuit 42 is coupled to the minimum on-time circuit 91 to receive the minimum on-time signal Vtmin. In one embodiment, the minimum on-time circuit 91 is configured to detect the on-time period of the rectifier switch SR, and configured to control the threshold selecting circuit 42 according to the on-time period of the rectifier switch SR. When the minimum on-time signal Vtmin indicates that the on-time period of the rectifier switch SR does not reached the minimum on-time period Tonmin, the threshold selection circuit 42 is configured to provide the turn-off threshold value Voff according to the fifth threshold Vth5, wherein the minimum on-time period Tonmin is less than the predetermined duration Texp.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A control circuit for a switching power supply circuit, the switching power supply circuit having a synchronous rectifier and providing an output voltage, the control circuit comprising:
a first input terminal, a second input terminal, and an output terminal, wherein the first input terminal is coupled to a drain of the synchronous rectifier, the second input terminal is coupled to a source of the synchronous rectifier, and the output terminal is configured to provide a driving signal to control the synchronous rectifier;
a turn-on control circuit, configured to provide a first comparison result between a drain-source voltage of the synchronous rectifier and a first threshold to turn on the synchronous rectifier;
a gate regulation circuit, configured to regulate the driving signal based on the drain-source voltage and an on-threshold;
a turn-off control circuit, configured to provide a second comparison result between the drain-source voltage and an off-threshold to turn off the synchronous rectifier; and
a gate logic circuit, configured to receive the first comparison result and the second comparison result, and configured to provide the driving signal based on the first comparison result and the second comparison result; wherein
when an ON-time period of the synchronous rectifier is less than a first time period, the off-threshold equals a second threshold, when the ON-time period of the synchronous rectifier is longer than the first time period, and is less than a second time period, the off-threshold equals a third threshold, and when the ON-time period of the synchronous rectifier is longer than the second time period, the off-threshold equals a fourth threshold, wherein the second threshold is larger than the third threshold, and the third threshold is larger than the fourth threshold.

2. The control circuit of claim 1, wherein when the ON-time period of the synchronous rectifier is less than the second time period, the driving signal maintains at a maximum voltage to keep the synchronous rectifier fully ON.

3. The control circuit of claim 1, wherein the second time period varies with the output voltage and the drain-source voltage.

4. The control circuit of claim 3, wherein the second time period varies reversely with the output voltage.

5. The control circuit of claim 1, wherein when the ON-time period of the synchronous rectifier is longer than the second time period, the on-threshold equals a fifth threshold, and the driving signal is regulated according to the drain-source voltage and the fifth threshold.

6. The control circuit of claim 1, wherein the turn-on control circuit further comprising:
a first comparator, having a first input terminal, a second input terminal, and an output terminal, wherein the first input terminal of the first comparator is configured to receive the drain-source voltage, the second input terminal of the first comparator is configured to receive the first threshold, and the output terminal of the first comparator is configured to provide the first comparison result via comparing the drain-source voltage with the first threshold.

7. The control circuit of claim 1, wherein the turn-off control circuit further comprising:
a second comparator, having a first input terminal, a second input terminal, and an output terminal, wherein the first input terminal of the second comparator is configured to receive the drain-source voltage, the second input terminal of the second comparator is configured to receive the off-threshold, and the output terminal of the second comparator is configured to provide the second comparison result via comparing the drain-source voltage with the off-threshold.

8. The control circuit of claim 1, wherein the gate regulation circuit further comprising:
an amplification circuit, having a first input terminal, a second input terminal, and an output terminal, wherein the first input terminal of the amplification circuit is configured to receive the drain-source voltage, the second input terminal of the amplification circuit is configured to receive the on-threshold, and the output terminal of the amplification circuit is configured to regulate the driving signal based on a difference between the drain-source voltage and the on-threshold.

9. The control circuit of claim 1, wherein when the drain-source voltage of the synchronous rectifier is less than the first threshold, the control circuit is configured to turn on the synchronous rectifier.

10. The control circuit of claim 1, wherein when the drain-source voltage of the synchronous rectifier is larger than the off-threshold, the control circuit is configured to turn off the synchronous rectifier.

11. A control circuit for a switching power supply circuit, the switching power supply circuit having a synchronous rectifier and providing an output voltage, the control circuit comprising:
a first input terminal, a second input terminal and an output terminal, wherein the first input terminal is coupled to a drain of the synchronous rectifier, the second input terminal is coupled to a source of the synchronous rectifier, and the output terminal is configured to provide a driving signal to control the synchronous rectifier;
a turn-on control circuit, configured to provide a first comparison result between a drain-source voltage of the synchronous rectifier and a first threshold to turn on the synchronous rectifier;
a gate regulation circuit, configured to regulate the driving signal based on the drain-source voltage and an on-threshold;
a turn-off control circuit, configured to provide a second comparison result between the drain-source voltage and an off-threshold to turn off the synchronous rectifier; and a gate logic circuit, configured to receive the first comparison result and the second comparison result, and configured to provide the driving signal based on the first comparison result and the second comparison result; wherein
when an ON-time period of the synchronous rectifier is less than a first time period, the off-threshold equals a second threshold, and when the ON-time period of the synchronous rectifier is longer than the first time period, the off-threshold equals a third threshold; and wherein
when the ON-time period of the synchronous rectifier is less than a second time period, the driving signal maintains at a maximum voltage to keep the synchronous rectifier fully ON, the second time period varies with the output voltage and the drain-source voltage.

12. The control circuit of claim 11, wherein the second time period is longer than the first time period, and when the ON-time period of the synchronous rectifier is longer than the second time period, the off-threshold equals a fourth threshold, and wherein the second threshold is larger than the third threshold, and the third threshold is larger than the fourth threshold.

13. The control circuit of claim 11, wherein the second time period varies inversely with the output voltage.

14. The control circuit of claim 11, wherein when the ON-time period of the synchronous rectifier is longer than the second time period, the on-threshold equals a fifth threshold, and the driving signal is regulated according to the drain-source voltage and the fifth threshold.

15. The control circuit of claim 11, wherein when the drain-source voltage of the synchronous rectifier is less than the first threshold, the control circuit is configured to turn on the synchronous rectifier.

16. The control circuit of claim 11, wherein when the drain-source voltage of the synchronous rectifier is larger than the off-threshold, the control circuit is configured to turn off the synchronous rectifier.

17. A control method for a switching power supply circuit, the switching power supply circuit having a synchronous rectifier, and providing an output voltage, the control method comprising:
providing a driving signal to control the synchronous rectifier based on a drain-source voltage across the synchronous rectifier;
turning on the synchronous rectifier via comparing the drain-source voltage with a first threshold;
regulating the driving signal based on the drain-source voltage and an on-threshold; and
turning off the synchronous rectifier via comparing the drain-source voltage with an off-threshold; wherein
when an ON-time period of the synchronous rectifier is less than a first time period, the off-threshold equals a second threshold, and when the ON-time period of the synchronous rectifier is longer than the first time period, the off-threshold equals a third threshold; and wherein
when the ON-time period of the synchronous rectifier is less than a second time period, the driving signal maintains at a maximum voltage to keep the synchronous rectifier fully ON, the second time period varies with the output voltage and the drain-source voltage.

18. The control method of claim 17, wherein the second time period is longer than the first time period, and when the ON-time period of the synchronous rectifier is longer than the second time period, the off-threshold equals a fourth threshold, and wherein the second threshold is larger than the third threshold, and the third threshold is larger than the fourth threshold.

19. The control method of claim 17, wherein when the ON-time period of the synchronous rectifier is longer than the second time period, the on-threshold equals a fifth threshold, and the driving signal is regulated according to the drain-source voltage and the fifth threshold.

20. The control method of claim 17, wherein the second time period varies inversely with the output voltage.

21. The control method of claim 17, wherein when the drain-source voltage of the synchronous rectifier is less than the first threshold, the synchronous rectifier is configured to be turned on.

22. The control method of claim 17, wherein when the drain-source voltage of the synchronous rectifier is larger than the off-threshold, the synchronous rectifier is configured to be turned off.

* * * * *